United States Patent
Sone et al.

(10) Patent No.: US 11,699,801 B2
(45) Date of Patent: Jul. 11, 2023

(54) CELL FOR WATER ELECTROLYSIS/FUEL CELL POWER GENERATION AND CELL STACK BODY HAVING A PLURALITY OF SAME CELLS STACKED

(71) Applicants: Japan Aerospace Exploration Agency, Tokyo (JP); KYUSHU UNIVERSITY, NATIONAL UNIVERSITY CORPORATION, Fukuoka (JP); KYOCERA CORPORATION, Kyoto (JP)

(72) Inventors: Yoshitsugu Sone, Tokyo (JP); Hiroshige Matsumoto, Fukuoka (JP); Yuki Terayama, Fukuoka (JP); Takamasa Haji, Fukuoka (JP); Riichi Sasamori, Kirishima (JP); Motohiko Sato, Ayase (JP)

(73) Assignees: JAPAN AEROSPACE EXPLORATION AGENCY; KYUSHU UNIVERSITY, NATIONAL UNIVERSITY CORPORATION; KYOCERA CORPORATION

( * ) Notice: Subject to any disclaimer, the term of this patent is extended or adjusted under 35 U.S.C. 154(b) by 1059 days.

(21) Appl. No.: 16/344,824

(22) PCT Filed: Nov. 1, 2017

(86) PCT No.: PCT/JP2017/039530
§ 371 (c)(1),
(2) Date: Apr. 25, 2019

(87) PCT Pub. No.: WO2018/084175
PCT Pub. Date: May 11, 2018

(65) Prior Publication Data
US 2019/0252708 A1   Aug. 15, 2019

(30) Foreign Application Priority Data

Nov. 1, 2016  (JP) .................................. 2016-214586
Sep. 22, 2017  (JP) .................................. 2017-182777

(51) Int. Cl.
H01M 8/04   (2016.01)
H01M 8/18   (2006.01)
(Continued)

(52) U.S. Cl.
CPC ............... *H01M 8/186* (2013.01); *C25B 1/04* (2013.01); *C25B 9/73* (2021.01);
(Continued)

(58) Field of Classification Search
CPC . H01M 8/186; H01M 8/04201; H01M 8/0656
See application file for complete search history.

(56) References Cited

U.S. PATENT DOCUMENTS

| 2003/0124414 A1* | 7/2003 | Hertel ................... C04B 35/522 429/535 |
| 2007/0099040 A1* | 5/2007 | Morita .............. H01M 8/04231 429/513 |
| 2016/0122885 A1* | 5/2016 | Ishikawa ................... C25B 9/05 204/257 |

FOREIGN PATENT DOCUMENTS

| JP | 2004-134134 A | 4/2004 |
| JP | 2004-259457 A | 9/2004 |

(Continued)

OTHER PUBLICATIONS

International Search Report dated Dec. 19, 2017 in corresponding PCT International Application No. PCT/JP2017/039530.
(Continued)

*Primary Examiner* — Olatunji A Godo
(74) *Attorney, Agent, or Firm* — Ostrolenk Faber LLP

(57) ABSTRACT

A cell for water electrolysis/fuel cell power generation which includes a flow path configured to supply or discharge
(Continued)

water in a first direction substantially perpendicular to a stacking direction of the cell; an oxygen-containing gas flow path configured to discharge or supply an oxygen-containing gas in a second direction substantially perpendicular to the stacking direction of the cell; and a hydrogen-containing gas flow path configured to discharge or supply the hydrogen-containing gas in a third direction substantially perpendicular to the stacking direction of the cell. Each of the oxygen-side electrode layer and the hydrogen-side electrode layer is an electrode layer having water repellency.

13 Claims, 12 Drawing Sheets

(51) Int. Cl.
  *H01M 8/04082* (2016.01)
  *H01M 8/0656* (2016.01)
  *C25B 1/04* (2021.01)
  *C25B 9/73* (2021.01)

(52) U.S. Cl.
  CPC ..... *H01M 8/04201* (2013.01); *H01M 8/0656* (2013.01); *Y02E 60/36* (2013.01)

(56) References Cited

FOREIGN PATENT DOCUMENTS

| | | |
|---|---|---|
| JP | 2007-012315 A | 1/2007 |
| JP | 2008-053193 A | 3/2008 |
| JP | 2010-153218 A | 7/2010 |
| JP | 2011-146395 A | 7/2011 |
| JP | 2014-194916 A | 10/2014 |
| JP | 5759687 B | 8/2015 |

OTHER PUBLICATIONS

Written Opinion dated Dec. 19, 2017 in corresponding PCT International Application No. PCT/JP2017/039530.

* cited by examiner

FIG.13
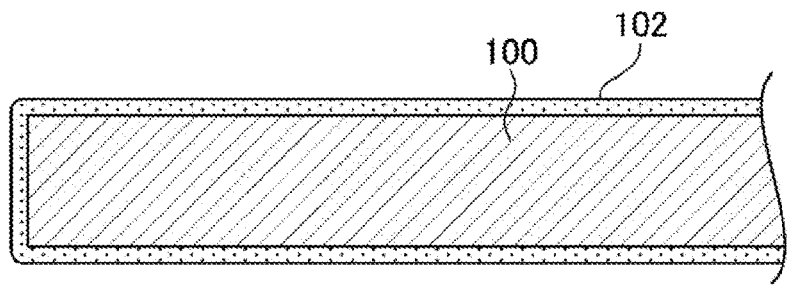
(a)
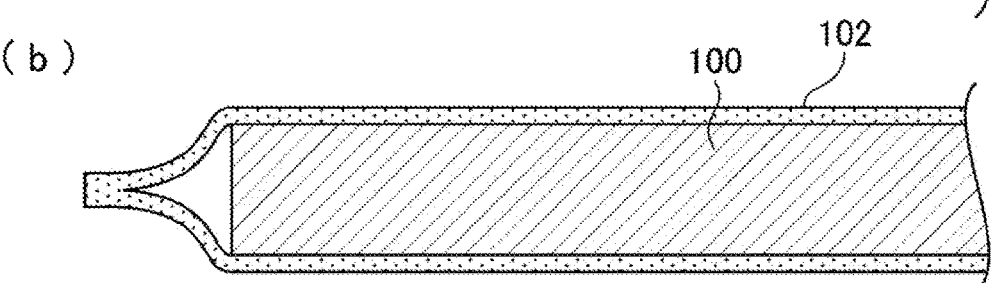
(b)
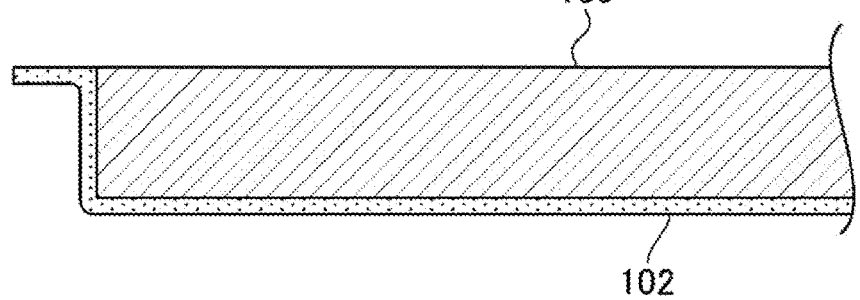
(c)
FIG.14
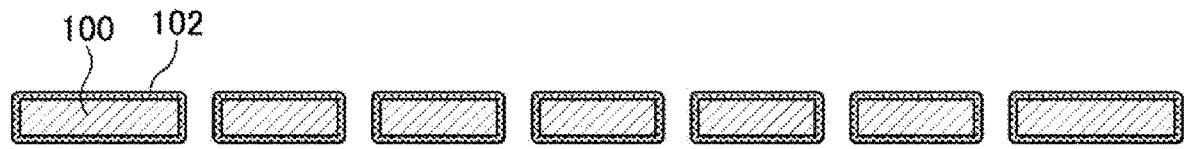

FIG.15
(a) MPL-GDL (WITHOUT REVERSE TRANSFERRING)
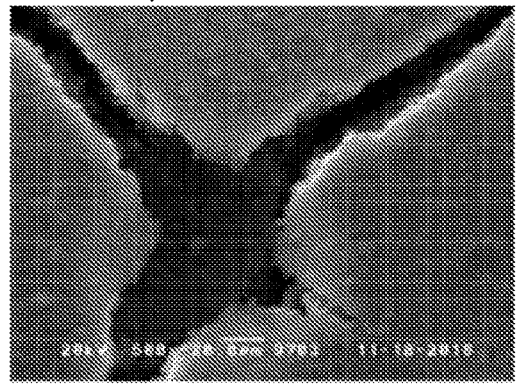
(b) REVERSE TRANSFERRED (HOT-PRESSED AT 280°C)
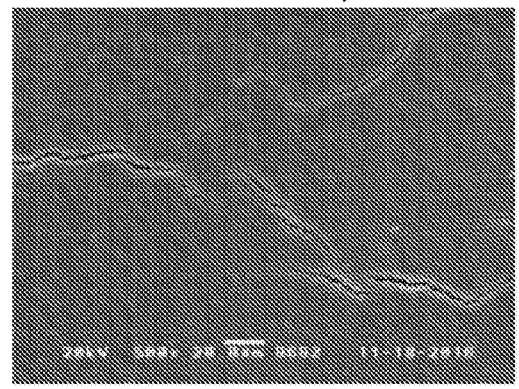
(c) REVERSE TRANSFERRED (HOT-PRESSED AT 330°C)
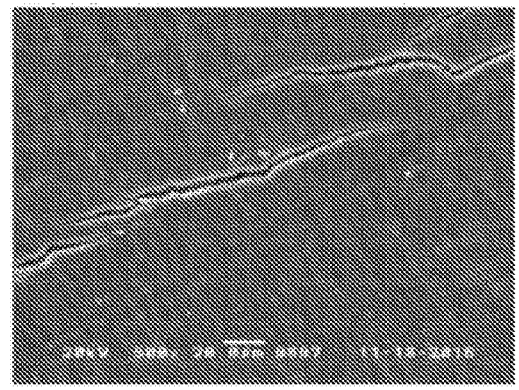
(d) REVERSE TRANSFERRED (HOT-PRESSED AT 360°C)
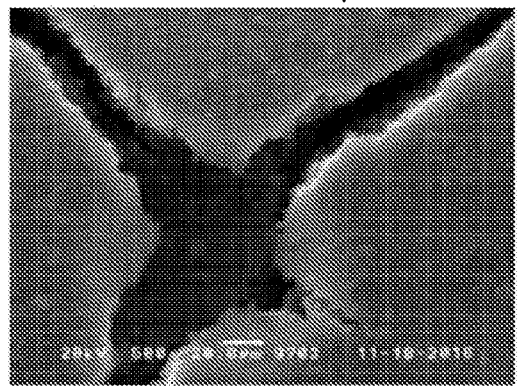

CELL FOR WATER ELECTROLYSIS/FUEL CELL POWER GENERATION AND CELL STACK BODY HAVING A PLURALITY OF SAME CELLS STACKED

CROSS-REFERENCE TO RELATED APPLICATIONS

The present application is a 35 U.S.C. §§ 371 national phase conversion of PCT/JP2017/039530, filed Nov. 1, 2017, which claims priority to Japanese Patent Application Nos. 2016-214586 and 2017-182777, filed Nov. 1, 2016 and Sep. 22, 2017, the contents of which are incorporated herein by reference. The PCT International Application was published in the Japanese language.

TECHNICAL FIELD

The present invention relates to a cell for water electrolysis/fuel cell power generation and a cell stack body including a plurality of cells stacked, enabling reversible switching of water electrolysis and fuel cell power generation in a single cell.

BACKGROUND ART

In recent years, the use of hydrogen as an energy source has attracted attention for utilization of renewable energy and reduction of carbon dioxide emissions. Along with this, research on fuel cells using hydrogen and oxygen as fuels, and a water electrolysis technique has been widely performed. In solid electrolyte type water electrolysis and fuel cell power generation, since a basic structure of the cell used are similar, research on a water electrolytic/fuel cell power generation reversible cell which can reversibly switch between the two of water electrolysis and fuel cell power generation in a single cell has been conducted (see, for example, Patent Literature 1).

Also, one of the inventors of the present invention has proposed a new water electrolysis cell with the aim of generating hydrogen and oxygen at a gas phase interface (Patent Literature 2). The water electrolysis cell includes a proton conductive porous electrolyte, an electrode (hereinafter also referred to as a "water-repellent electrode") (cathode and anode) configured to include a water repellent material and bonded to each of both surfaces of the aforementioned porous electrolyte, and means for supplying water to the porous electrolyte, and is able to generate oxygen gas and hydrogen gas in the gas phase.

In the water electrolysis cell proposed in Patent Literature 2, hydrous titanium oxide nanoparticles are used as a material of the porous electrolyte. Further, the water repellent electrode is constituted by supporting catalyst particles, platinum-supporting carbon is used as a catalyst, and Teflon (registered trademark) modified porous carbon is used as a water repellent conductive carrier. In addition, the water repellent electrode (anode and cathode) has a two-layer structure including a gas diffusion electrode layer made up of a mixture of a semi-water repellent material and a catalyst on the side of a surface joined to the porous electrolyte, and a current collector layer made up of an electrically conductive water repellent material on the outside thereof.

According to the water electrolysis cell proposed in Patent Literature 2, since the water electrolysis cell has a structure in which hydrogen gas and oxygen gas are formed in the gas phase, as compared to the water electrolysis cell of related art having a structure for generating hydrogen gas and oxygen gas in the liquid phase, the energy required for bubble generation becomes unnecessary, and the efficiency is improved accordingly. Further, water supplied to the porous electrolyte can be pressurized, using the water repellent material that prevents entry of water and allows only gases to pass through as an electrode material. This makes it possible to easily produce pressurized hydrogen or pressurized oxygen. When using these characteristics, it is possible to greatly reduce the energy required for boosting when supplying high-pressure hydrogen to, for example, fuel cell vehicles, hydrogen automobiles and the like.

CITATION LIST

Patent Literature

[Patent Literature 1]
  Japanese Unexamined Patent Application, First Publication No. 2011-146395
[Patent Literature 2]
  Japanese Patent No. 5759687
[Patent Literature 3]
  Japanese Unexamined Patent Application, First Publication No. 2004-134134

SUMMARY OF INVENTION

Technical Problem

The water electrolysis/fuel cell power generation reversible cells of the related art have problems of supply of water and removal (drying) of water inside the cells at the time of switching an operation mode. That is, in a water electrolysis mode, water is supplied to the electrolyte layer, and it is necessary to discharge the hydrogen gas and the oxygen gas generated in the electrolyte layer to the outside of the cell. In a fuel cell power generation mode, it is necessary to cause the supplied hydrogen gas or oxygen gas to pass through the gas diffusion layer to reach the electrode layer. Also, in the fuel cell power generation mode, the gas diffusion layer portion needs to be dry, but a portion of the electrolyte needs to be moist since the hydrogen gas needs to be in a state of protons (H+). In this way, in the water electrolysis mode and the fuel cell power generation mode, since the abilities (hydrophilicity and water repellency) required in respective parts inside the cell conflict with each other, it is not easy to obtain a satisfactory performance for both modes in the existing cell structure.

In addition, in Patent Literature 1, a reversible cell provided with a means for supplying/drying water is proposed, but it takes considerable time to switch between operation modes, and it is not possible to start operation immediately after switching from one mode to the other mode. In addition, although research on optimization of members constituting reversible cells has also been conducted (see Patent Literature 3), there has been no practical application thereof.

The present invention has been made under the circumstances as described above, and an object thereof is to provide a water electrolysis/fuel cell power generation reversible cell which is able to switch easily between a water electrolysis mode and a fuel cell power generation mode, and which is immediately operational in a mode immediately after switching when switching from one mode to the other mode.

Solution to Problem

The present invention provides the following cell or cell stack of (1) to (8).

(1) A cell for water electrolysis/fuel cell power generation, which is configured to: apply a voltage between a hydrogen-side electrode and an oxygen-side electrode to perform electrolysis of water supplied to an electrolyte; and perform a fuel cell power generation in the hydrogen-side electrode, the electrolyte and the oxygen-side electrode by using hydrogen-containing gas and oxygen-containing gas supplied thereto, the cell for water electrolysis/fuel cell power generation including:

a cell stack part in which an oxygen-side electrode layer, an electrolyte layer, a hydrogen-side electrode layer, a first gas separator configured for an oxygen-containing gas separated from a liquid water to pass through therein between the oxygen-side electrode layer and the electrolyte layer, and a second gas separator configured for a hydrogen-containing gas separated from the liquid water to pass through therein between the electrolyte layer and the hydrogen-side electrode layer are stacked, and a catalyst layer is provided between the oxygen-side electrode layer and the electrolyte layer and/or between the electrolyte layer and the hydrogen-side electrode layer;

a water flow path configured to supply or discharge water in a first direction substantially perpendicular to a stacking direction of the cell;

an oxygen-containing gas flow path configured to discharge or supply an oxygen-containing gas in a second direction substantially perpendicular to the stacking direction of the cell; and a hydrogen-containing gas flow path configured to discharge or supply the hydrogen-containing gas in a third direction substantially perpendicular to the stacking direction of the cell, wherein each of the oxygen-side electrode layer and the hydrogen-side electrode layer is an electrode layer having water repellency.

(2) In the cell for water electrolysis/fuel cell power generation described in (1), a plurality of slits are formed in the oxygen-side electrode layer, a plurality of channels communicating with the water flow path are formed on one surface of the first gas separator, and the first gas separator and the oxygen-side electrode are stacked, and the plurality of channels are aligned with the plurality of slits of the oxygen-side electrode to supply water from the water flow path to the surface of the electrolyte layer during electrolysis of water.

(3) In the cell for water electrolysis/fuel cell power generation described in (1) or (2), a ladder-shaped member is formed between the plurality of slits of the oxygen-side electrode layer, at least one oxygen-side vent hole penetrating to the other surface and communicating with the oxygen-containing gas flow path is formed in a partially ladder-shaped portion of the first gas separator other than the plurality of channels, and the oxygen-side vent hole is aligned with the ladder-shaped member of the oxygen-side electrode layer for the oxygen-containing gas having passed through the oxygen-side electrode layer during electrolysis to flow through the oxygen-containing gas flow path.

(4) In the cell for water electrolysis/fuel cell power generation described in any one of (1) to (3), at least one hydrogen-side vent hole penetrating and communicating with the hydrogen-containing gas flow path is formed in the second gas separator, and the hydrogen-containing gas having passed through the hydrogen-side electrode layer during electrolysis of water flows through the hydrogen-containing gas flow path.

(5) A cell for water electrolysis/fuel cell power generation, which is configured to: apply a voltage between a hydrogen-side electrode and an oxygen-side electrode to perform electrolysis of water supplied to an electrolyte; and perform a fuel cell power generation in the hydrogen-side electrode, the electrolyte and the oxygen-side electrode by using hydrogen-containing gas and oxygen-containing gas supplied thereto, the cell for water electrolysis/fuel cell power generation including:

a cell stack part in which a first gas diffuser/separator, an oxygen-side electrode layer held on the first gas diffuser/separator, an electrolyte layer, an electrolyte holding portion which holds the electrolyte layer, a hydrogen-side electrode layer, and a second gas diffuser/separator which holds the hydrogen-side electrode layer are stacked, and a catalyst layer is provided between the oxygen-side electrode layer and the electrolyte layer and/or between the electrolyte layer and the hydrogen-side electrode layer;

an oxygen-containing gas flow path provided in the first gas diffuser/separator in a second direction substantially perpendicular to the stacking direction;

a hydrogen-containing gas flow path provided in the second gas diffuser/separator in a third direction substantially perpendicular to the stacking direction and the second direction; and a water flow path provided in the electrolyte holding portion in a first direction substantially perpendicular to the stacking direction and configured to supply or discharge water from a side surface of a layer including the electrolyte, wherein each of the oxygen-side electrode layer and the hydrogen-side electrode layer is an electrode layer having water repellency.

(6) The cell for water electrolysis/fuel cell power generation described in any one of (1) to (5), wherein the electrolyte is a proton ($H^+$) conductive porous electrolyte and/or a dense electrolyte.

(7) The cell for water electrolysis/fuel cell power generation described in any one of (1) to (6), wherein one or both of the oxygen-side electrode layer and the hydrogen-side electrode layer includes Teflon (registered trademark) modified porous carbon.

(8) In a cell stack body formed by stacking two or more of the cell described in one of (1) to (7) in the stacking direction, at least a part of water flow paths in each cell are connected to each other, at least a part of oxygen flow paths in each cell are connected to each other, at least a part of hydrogen flow paths in each cell are connected to each other, at least a part of the oxygen-side electrode layers in each cell are electrically connected to each other, and at least a part of the hydrogen-side electrode layers in each cell are electrically connected to each other.

Advantageous Effects of Invention

According to the present invention, it is possible to provide a water electrolysis/fuel cell power generation reversible cell capable of switching between the water electrolysis mode and the fuel cell power generation mode, and capable of performing operation in a mode immediately after switching when switching from one mode to the other mode.

BRIEF DESCRIPTION OF DRAWINGS

FIG. 13 is a cross-sectional view illustrating a state in which a water repellent agent is transferred to an end portion of a carbon paper.

FIG. 14 is a cross-sectional view illustrating a state in which ladder-shaped carbon paper is coated with a water repellent agent as GDL.

FIG. 15 is a diagram illustrating an SEM image of a surface subjected to water repellent treatment of a gas diffusion electrode layer.

DESCRIPTION OF EMBODIMENTS

The present embodiment will be described below, but it is not to be construed as being limited by the following embodiments Further, in the following description, the terms "oxygen", "oxygen gas", "hydrogen" and "hydrogen gas" are mentioned, but "oxygen-containing gas", "hydrogen-containing gas" may be used.

First Embodiment

Figure 1:
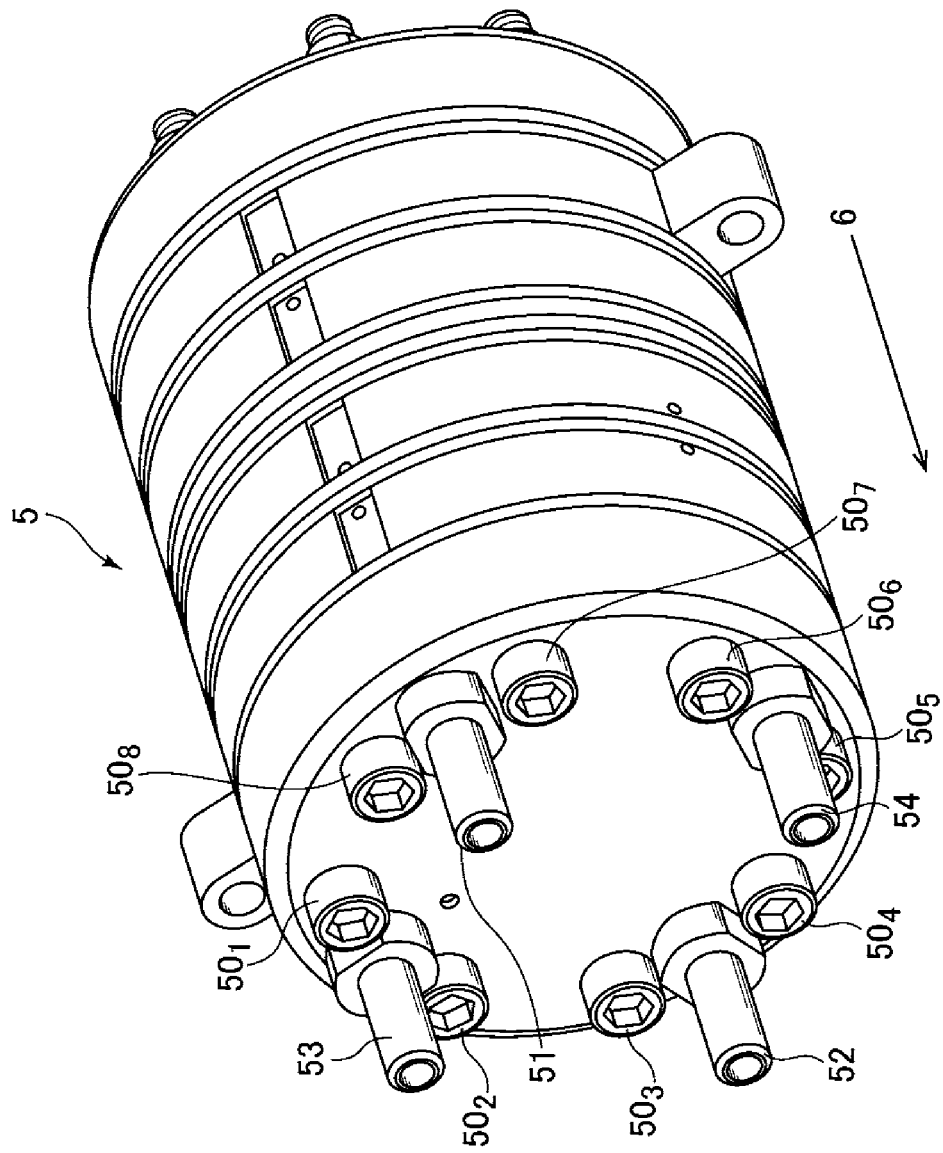
FIG. 1 is a perspective view illustrating a cell stack according to a first embodiment.
Figure 2:
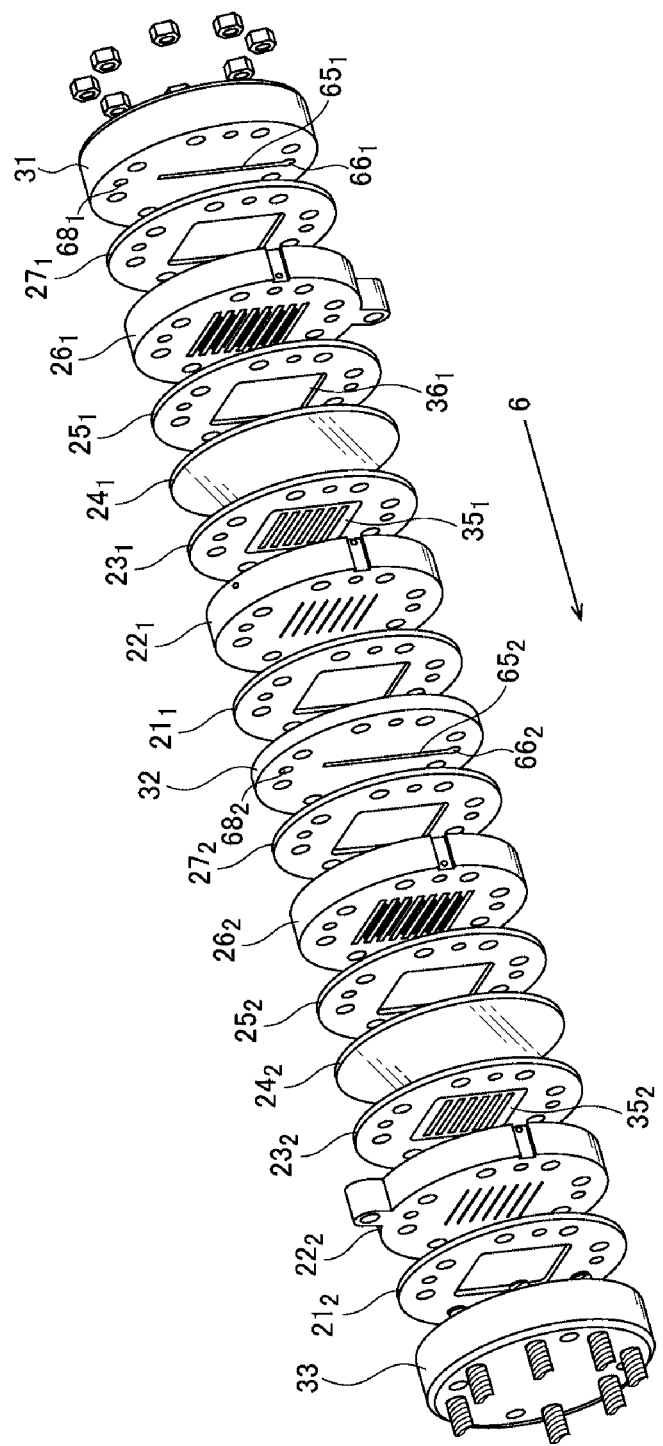
FIG. 2 is an exploded view illustrating respective parts constituting the cell stack illustrated in FIG. 1 in a state of being separated from each other in a direction indicated by arrows.

FIG. 1 is a perspective view illustrating a cell stack 5 according to the first embodiment, and FIG. 2 is an exploded view illustrating respective parts constituting the cell stack 5 illustrated in FIG. 1 in a state of being separated from each other in the direction of an arrow 6. The cell stack 5 illustrated in FIG. 1 is assembled by bringing the respective parts illustrated in FIG. 2 into close contact with each other and fastening eight bolts $50_1$ to $50_8$ to corresponding nuts.

The cell stack 5 of FIG. 1 is formed by stacking two water electrolysis/fuel cell power generation reversible cells (hereinafter, in some cases, simply referred to as "cells") in a direction indicated by an arrow 6. A first cell includes stacked parts $21_1$ to $27_1$ and an end plate 31 illustrated in FIG. 2, and a second cell includes an end plate 33 and stacked parts $21_2$ to $27_2$ illustrated in FIG. 2. The intermediate plate 32 is shared by both the first and second cells. In the first cell and the second cell illustrated in FIG. 2, since parts having the same reference numerals different only in terms of suffix letters are parts corresponding to each other, and have the same functions, only the first cell will be described below, and suffixes will be omitted unless necessary.

In FIG. 2, the part denoted by reference numeral 24 is an electrolyte layer made of a solid electrolyte. In the present embodiment, a left side of the electrolyte layer 24 is disposed on the oxygen side, and a right side of the electrolyte layer 24 is disposed on the hydrogen side. However, this arrangement with respect to the oxygen side and the hydrogen side may be reversed.

A gasket 23, a gas separator 22, a gasket 21, and an intermediate plate 32 are disposed on the left side (oxygen side) of the electrolyte layer 24. On the other hand, a gasket 25, a gas separator 26, a gasket 27, and an end plate 31 are disposed on the right side (hydrogen side) of the electrolyte layer 24. A rectangular gas diffusion electrode layer 35 is fitted into a central portion of the oxygen side gasket 23. The gas diffusion electrode layer 35 serves as an oxygen-side electrode layer. The gas diffusion electrode layer 35 is provided with a plurality of parallel slits 45 (which will be described below). On the other hand, a rectangular gas diffusion electrode layer 36 with no slits is fitted in the central portion of the gasket 25 on the hydrogen side. The gas diffusion electrode layer 36 serves as a hydrogen-side electrode.

Figure 3:
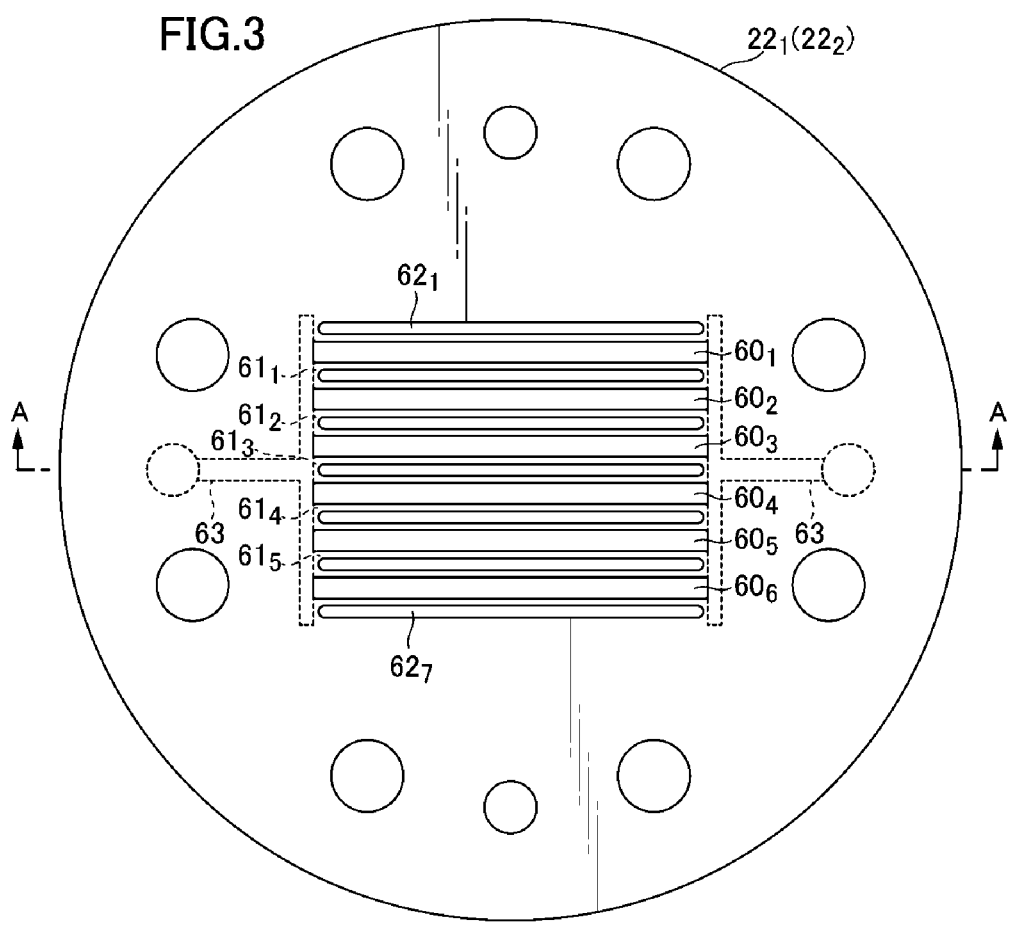
FIG. 3 is a plan view of a gas separator.
Figure 4:
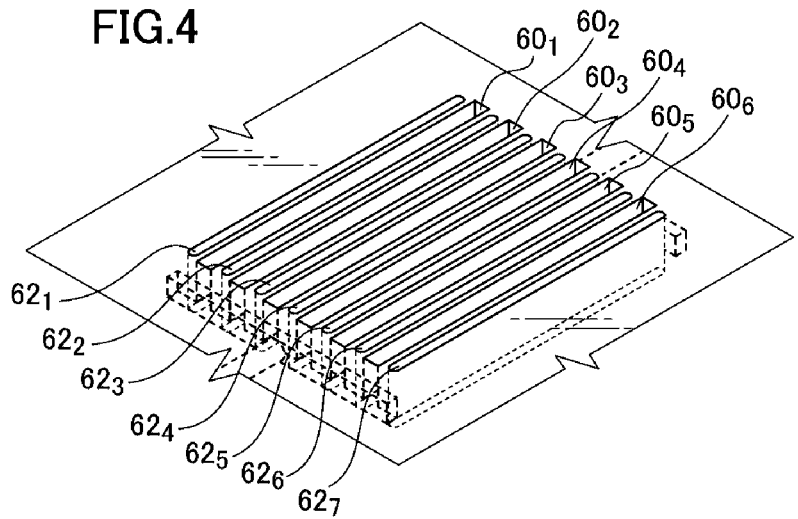
FIG. 4 is a perspective view illustrating only a channel and a plate-shaped portion of the gas separator.

FIG. 3 is a plan view illustrating a surface (a surface on the side not visible in FIG. 2) on the right side of the gas separator 22 when viewed from the top. As illustrated in FIG. 3, six parallel channels $60_1$ to $60_6$ sunk in a thickness direction (a direction perpendicular to the paper surface of FIG. 3) are formed in the central portion of the gas separator 22, and as a result, elongated plate-shaped portions $61_1$ to $61_5$ are formed between the channels. FIG. 4 is a perspective view illustrating only the portions of the channel 60 and the plate-shaped portion 61 illustrated in FIG. 3. As illustrated in FIG. 4, vent holes $62_1$ to $62_7$ are provided at plate-shaped portions $61_1$ to $61_5$ and edges on both sides parallel to the plate-shaped portions $61_1$ to $61_5$. Each of the vent holes $62_1$ to $62_7$ passes through the gas separator 22.

Figure 5:
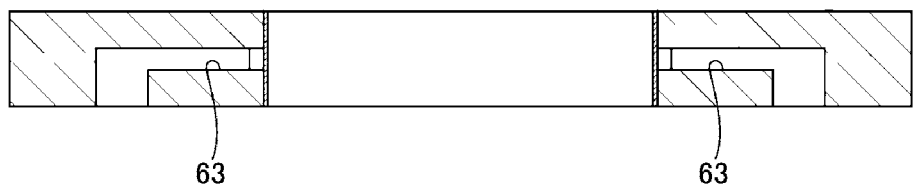
FIG. 5 is a cross-sectional view taken along the line A-A of FIG. 3 and perpendicular to a page space.

FIG. 5 is a cross-sectional view taken along a line A-A of FIG. 3 in a direction perpendicular to the paper surface. As illustrated in FIG. 5, water flow paths 63 are formed inside the gas separator 22 in a tunnel shape. One of the water flow paths 63 is connected to the water flow paths 51 and 52 illustrated in FIG. 1, and the other thereof is connected to the respective channels $60_1$ to $60_6$. The water flow paths 51 and 52 illustrated in FIG. 1 extend parallel to the arrow 6, but the water flow path 63 formed inside the gas separator 22 extends in a direction perpendicular to the arrow 6, that is, a direction perpendicular to the stacking direction of the cell. By providing the water flow path 63 in the direction perpendicular to the stacking direction of the cell as described above, a plurality of cells can be stacked compactly.

Figure 6:
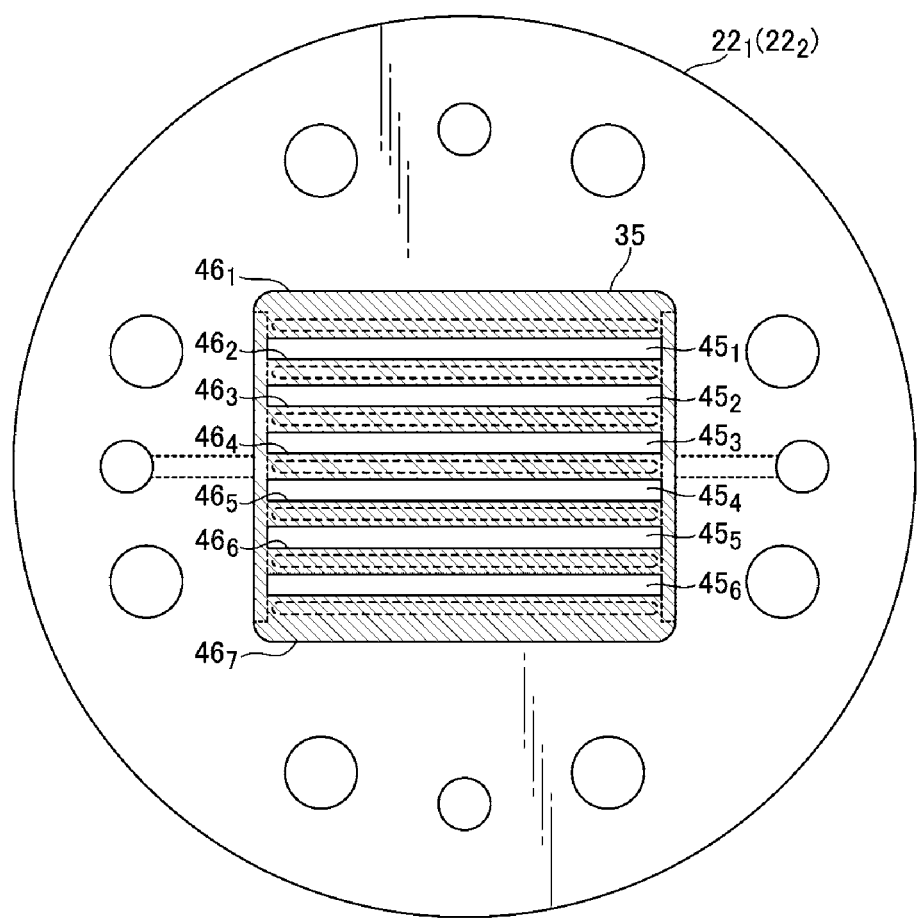
FIG. 6 is a plan view illustrating a positional relationship between a gas separator and a gas diffusion electrode layer when a cell is assembled.

FIG. 6 is a plan view illustrating the positional relationship between the gas separator 22 and the gas diffusion electrode layer 35 when the cell is assembled. In practice, as illustrated in FIG. 2, the gas diffusion electrode layer 35 is fitted into the gasket 23, and by assembling the entire cell including the gasket 23, the gas separator 22 and the gas diffusion electrode layer 35 are brought into the positional relationship illustrated in FIG. 6.

As illustrated in FIG. 6, the respective slits $45_1$ to $45_6$ provided in the gas diffusion electrode layer 35 are aligned with the corresponding channels $60_1$ to $60_6$ provided in the gas separator 22. The ladder-shaped members $46_1$ to $46_7$ between the slits and the slits of the gas diffusion electrode layer 35 are aligned with the corresponding plate-shaped portions $61_1$ to $61_5$ of the gas separator 22 and the edges on both sides parallel thereto, and block the plate-shaped portions $61_1$ to $61_5$ and the vent holes $62_1$ to $62_7$ provided at the edges on both sides. As a result, it is possible to prevent water from entering the vent holes $62_1$ to $62_7$ to be described below.

As illustrated in FIG. 2, a plurality of channels are also formed on the left side surface of the gas separator 26, but this is not indispensable as in the case of the gas separator 22.

Carbon paper (not illustrated) is fitted in the central portion of the gaskets 21 and 27 illustrated in FIG. 2. The carbon paper fitted in the gasket 27 allows diffusion of hydrogen gas passing therethrough and communicates with a hydrogen gas flow path 65 provided on the left side surface of the end plate 31. The hydrogen gas flow path 65 is connected to a flow path 66 provided on the side below thereof, and communicates with the hydrogen gas flow path 54 illustrated in FIG. 1 through here. On the other hand, the gas diffusion layer fitted in the gasket 21 diffuses the oxygen gas passing therethrough, and communicates with the oxygen gas flow paths each provided on the right side (a side not visible in FIG. 2) of the intermediate plate 32. The oxygen gas flow paths are connected to a flow path 68 provided on the side above thereof and communicate with the oxygen gas flow path 53 illustrated in FIG. 1 through here.

Figure 7:
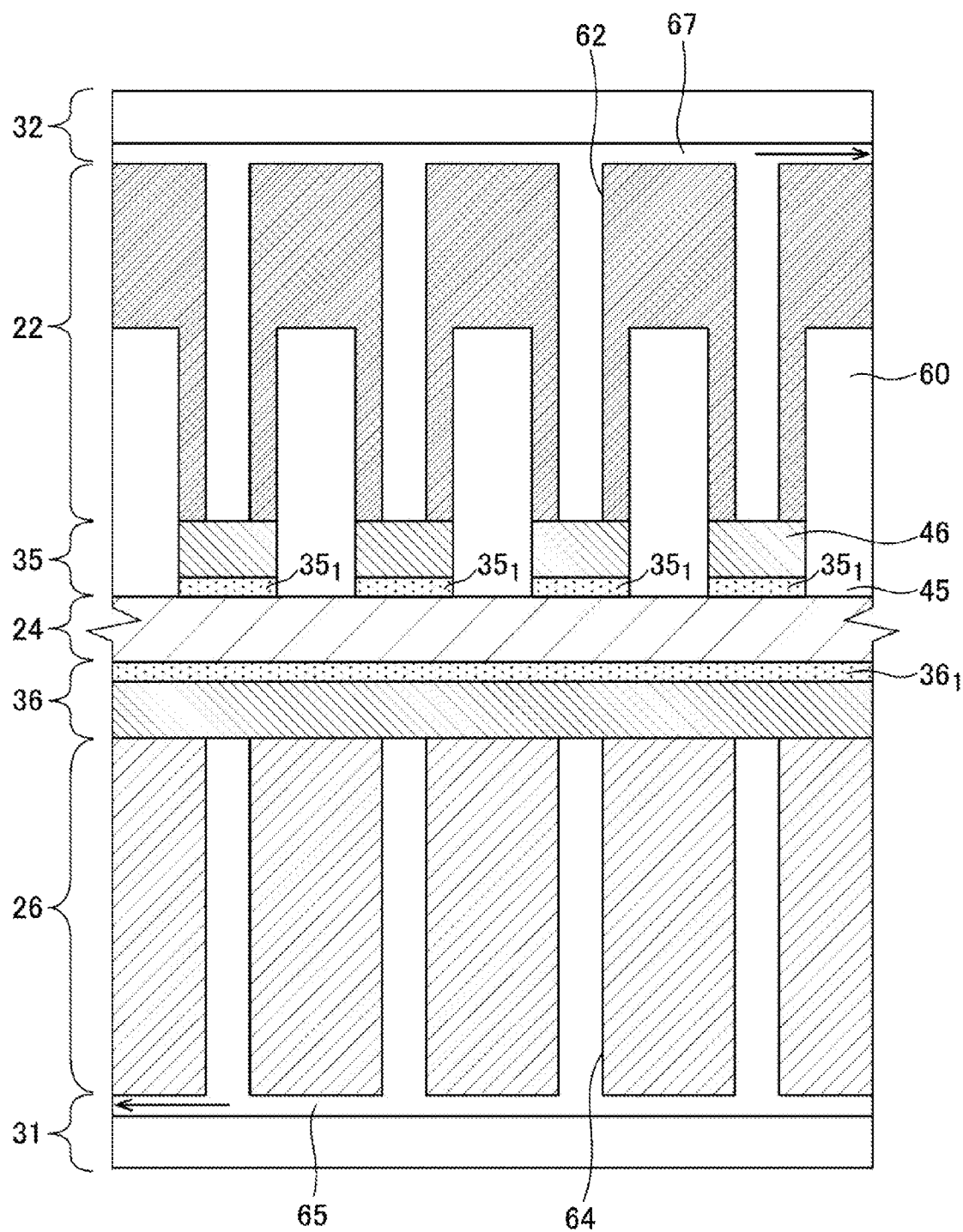
FIG. 7 is an enlarged view schematically illustrating a cross section perpendicular to a plate-shaped portion, in one cell of a cell stack in a state of being realized by respective parts illustrated in FIG. 2 being assembled together.

FIG. 7 is an enlarged view schematically illustrating a cross section taken perpendicularly to the plate-shaped portion 60 unlike FIG. 5, in one cell of the cell stack 5 in a state of having been completed by combining the respective parts illustrated in FIG. 2. In FIG. 7, the above-described carbon paper is omitted because it is not an essential constituent element. As illustrated in FIG. 7, the electrolyte layer 24 is in the central portion, the side above thereof is the oxygen side, and the side below thereof is the hydrogen side.

As the solid electrolyte constituting the electrolyte layer 24, a proton (H+) conductive porous electrolyte can be used. As a specific material, inorganic ceramics (for example, hydrous titanium oxide nanoparticles) disclosed in Patent Literature 2 can be suitably used. As another example of the solid electrolyte constituting the electrolyte layer 24, it is possible to use proton conductive Nafion (registered trademark) or the like which is a dense electrolyte.

As materials of the gas diffusion electrode layer 35 on the oxygen side and the gas diffusion electrode layer 36 on the hydrogen side sandwiching the electrolyte layer 24, for example, Teflon (registered trademark) modified porous carbon described in Patent Literature 2 can be suitably used. By using this material, it is possible to allow oxygen gas and hydrogen gas to permeate inside. In addition, the gas diffusion electrode layer 35 and the gas diffusion electrode layer 36 are subjected to a water repellent treatment as a whole, and have strong water repellency. As a result, it is possible to prevent water from entering the inside of the gas diffusion electrode layer 35 and the gas diffusion electrode layer 36.

Catalyst layers $35_1$ and $36_1$ are formed on the surfaces of the sides of the gas diffusion electrode layer 35 and the gas diffusion electrode layer 36 joined to the electrolyte layer 24, respectively. As the catalyst material, the platinum-supporting carbon disclosed in Patent Literature 2 can be suitably used. Several layers of atoms of the catalyst may be sufficient, and for this purpose, for example, a method of spraying the catalyst material in a spray form can be applied by spray. Further, although in this embodiment, the catalyst layer is formed on the gas diffusion electrode layer 35 on the oxygen side and the gas diffusion electrode layer 36 on the hydrogen side, a catalyst layer may be formed on the surface of the electrolyte layer 24.

In the water electrolysis mode, a voltage is applied to the gas diffusion electrode layers 35 and 36. As a result, the oxygen gas generated at an interface (a catalyst layer) between the gas diffusion electrode layer 35 and the electrolyte layer 24 permeates through the ladder-shaped member 46 of the gas diffusion electrode layer 35, is guided to the vent holes $62_1$ to $62_7$ of the gas separator 22, and diffuses due to carbon paper (not illustrated) through this. Thereafter, the oxygen gas is discharged from the oxygen gas flow path 53 illustrated in FIG. 1 to the outside through the gas flow path 67 and the flow path 68 provided in the intermediate plate 32 or the end plate 33. On the other hand, the hydrogen gas generated at the interface (the catalyst layer) between the gas diffusion electrode layer 36 and the electrolyte layer 24 passes through the inside of the planar gas diffusion electrode layer 36 while diffusing, is guided to the vent hole 64 of the gas separator 26, and is diffused by gas carbon paper (not illustrated) through this. Thereafter, the hydrogen gas is discharged from the hydrogen gas flow path 54 illustrated in FIG. 1 to the outside through the gas flow path 65 and the flow path 66 provided in the end plate 31.

As described above, the gas diffusion electrode layers 35 and 36 have strong water repellency. Therefore, water supplied from the outside to the electrolyte layer 24 through the water flow path 63, the channels $60_1$ to $60_6$, and the slits $45_1$ to $45_6$ does not enter the gas diffusion electrode layers 35 and 36. Therefore, the paths of the oxygen gas and the hydrogen gas are completely separated from the water path, and they do not mix. In this way, in the cell of the present embodiment, water is directly supplied to the electrolyte layer 24 made of the solid electrolyte in the water electrolysis mode. The supplied water is blocked by the water-repellent gas diffusion electrode layers 35 and 36, and does not enter the inside of the gas diffusion electrode layers 35 and 36 or the inside of the gas separators 22 and 26. That is, the water path, the oxygen gas path, and the hydrogen gas path are completely independent and separated from each other.

On the other hand, in the fuel cell power generation mode, the flow until the oxygen gas and hydrogen gas supplied from the outside to the electrolyte layer 24, and the flow of water generated in the electrolyte layer 24 are opposite to that in the water electrolysis mode. At this time, since the gas diffusion electrode layer 35 and the gas diffusion electrode layer 36 have strong water repellency, oxygen gas and hydrogen gas to be supplied can be pressurized. By pressurizing the oxygen gas and the hydrogen gas, the water generated in the electrolyte layer 24 is biased toward the slits $45_1$ to $45_6$ and is smoothly discharged.

With the above configuration, water clogging does not occur in the cell stack 5 of the present embodiment even when switching from the water electrolysis mode to the fuel cell power generation mode, and it is possible to stably operate in the fuel cell power generation mode immediately after switching. In addition, also when switching from the fuel cell power generation mode to the water electrolysis mode, it is possible to perform operation in the water electrolysis mode immediately after switching. In particular, in the switching between the fuel cell power generation mode and the water electrolysis mode, since there is no need for a process of drying/supplying water required in the cell of related art, a seamlessly switchable reversible cell can be used.

Further, as described above, the supply and discharge of water are performed in a first direction substantially perpendicular to the stacking direction, and the supply and discharge of the oxygen gas and the hydrogen gas are performed in second and third directions substantially perpendicular to the stacking direction, thereby stacking a plurality of cells such as the first cell and the second cell. Thus, it is possible to realize a compact size in the stacking direction and to improve the ability of the water electrolysis cell and the fuel cell power generation cell.

Second Embodiment

Figure 8:
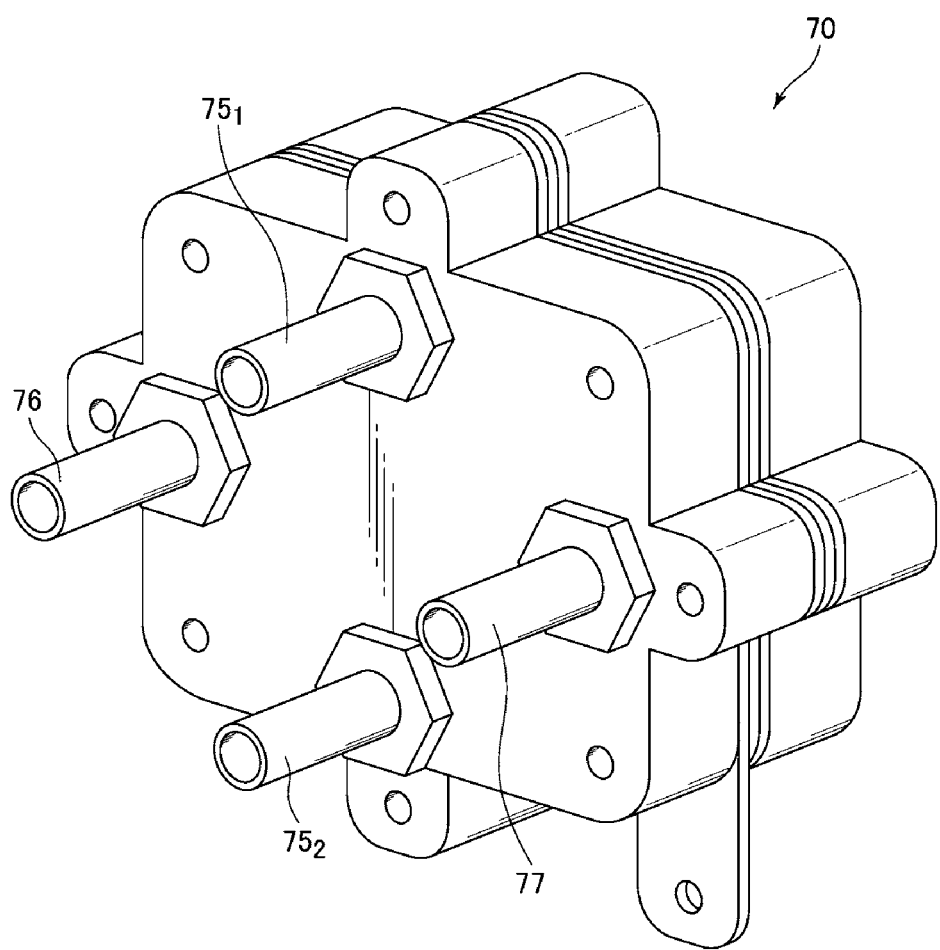
FIG. 8 is a perspective view illustrating a cell stack according to a second embodiment.
Figure 9:
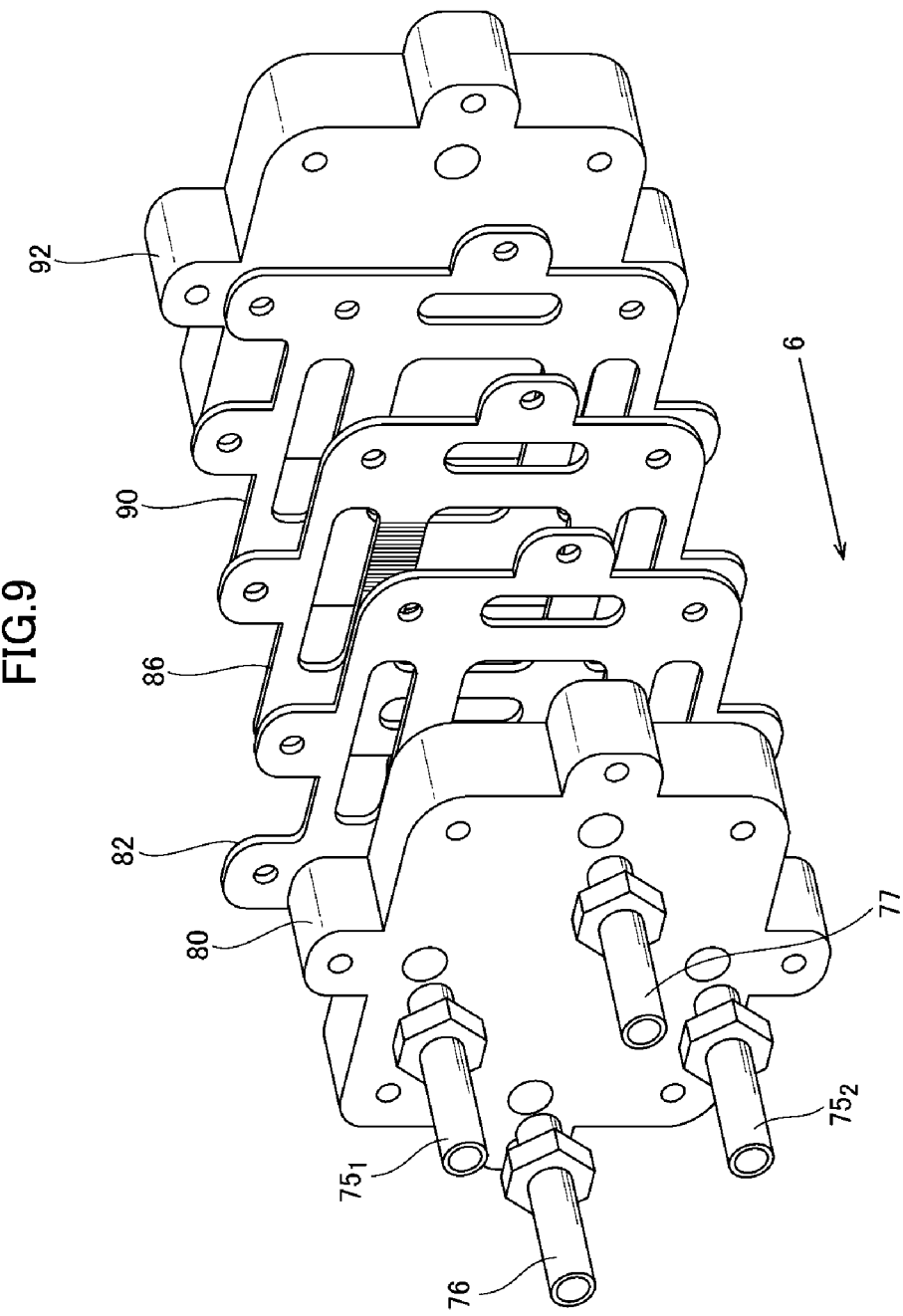
FIG. 9 is an exploded view illustrating the respective parts constituting the cell stack illustrated in FIG. 8 in a state of being separated from each other in a direction indicated by arrows.

FIG. 8 is a perspective view illustrating a cell stack 70 according to the second embodiment of the present invention, and FIG. 9 is an exploded view illustrating the respective parts constituting the cell stack 70 illustrated in FIG. 8 in a state of being separated from each other on a direction of an arrow 6. The cell stack 70 illustrated in FIG. 8 is assembled by bringing the respective parts illustrated in FIG. 9 into close contact with each other and tightening bolts and nuts (not illustrated). The cell stack 70 of the second embodiment illustrated in FIG. 8 includes one water electrolysis/fuel cell power generation reversible cell. However, like the cell stack 5 of the first embodiment, any number of cells can be stacked in the direction indicated by the arrow 6. Therefore, in the present embodiment, the term "cell stack (cell stack body)" is also used for convenience.

Among the respective parts illustrated in FIG. 9, the part denoted by reference numeral 86 disposed at the center between the two end plates 80 and 92 is a solid electrolyte holding portion, and the left side of FIG. 9 is disposed on the oxygen side and the right side is disposed on the hydrogen side as viewed from the solid electrolyte holding portion 86. However, the arrangement on the oxygen side and the arrangement on the hydrogen side may be reversed as in the first embodiment. Further, in the actual cell stack 70, various gaskets may be used depending on the situation, but illustration is omitted here for the sake of simplifying the explanation. A member 82 is a gas diffuser/separator on the oxygen side, and a member 90 is a gas diffuser/separator on the hydrogen side.

Figure 10:
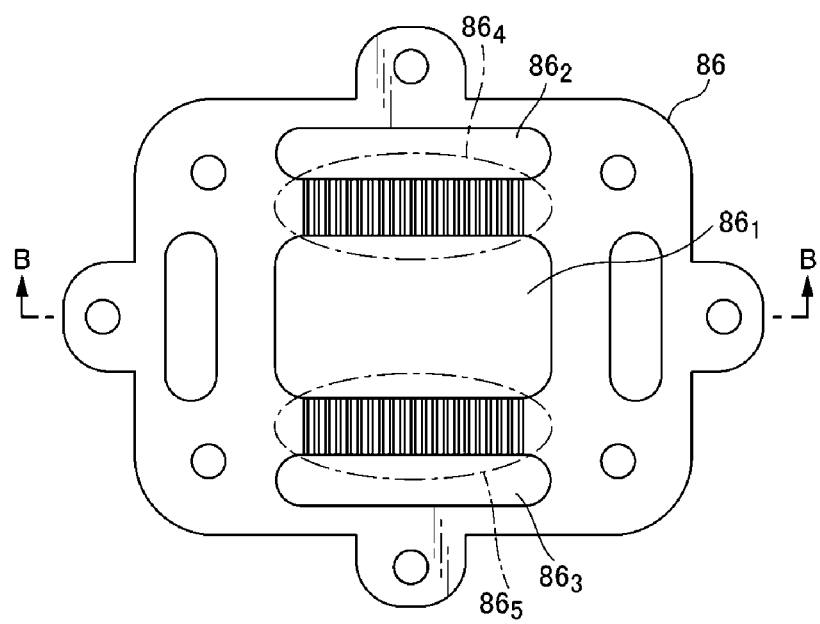
FIG. 10 is a plan view of a solid electrolyte holding portion.

FIG. 10 is a plan view of the solid electrolyte holding portion 86. A central opening $86_1$ is formed in the center portion of the solid electrolyte holding portion 86. A solid electrolyte 95 (FIG. 12) to be described below is fitted into the central opening 861. As the solid electrolyte, as in the first embodiment, it is possible to use a proton (H+) conductive porous electrolyte or proton conductive Nafion (registered trademark) which is a dense electrolyte. Further, it may be a solid electrolyte containing both a porous electrolyte and a dense electrolyte.

As illustrated in FIG. 10, an opening portion $86_2$ is provided above the central opening $86_1$ of the solid electrolyte holding portion 86. Further, a plurality of water flow paths $86_4$ are formed between the central opening $86_1$ and the opening portion $86_2$, and connect the central opening $86_1$ and the opening portion $86_2$. Similarly, an opening portion $86_3$ is provided under the central opening $86_1$, and a plurality of water flow paths $86_5$ are formed between the central opening $86_1$ and the opening portion $86_3$ to connect the central opening $86_1$ and the opening portion $86_3$. The water flow path which connects the central opening and the opening portion may be one as long as water can be circulated.

When the cell stack 70 is assembled, the opening portions $86_2$ and $86_3$ are connected to the water flow paths $75_1$ and $75_2$ illustrated in FIG. 8, respectively. Therefore, in the water electrolysis mode, the water supplied from the water flow paths $75_1$ and $75_2$ is supplied from the opening portions $86_2$ and $86_3$ to the solid electrolyte 95 fitted in the central opening 86 via the water flow paths $86_4$ and $86_5$. The formation direction of the water flow paths $86_4$ and $86_5$ is a direction perpendicular to the stacking direction of the cell stack (the direction indicated by the arrow 6). In this way, it is possible to stack a plurality of cells by providing the water flow paths $86_4$ and $86_5$ in the direction perpendicular to the stacking direction, as in the first embodiment. However, in the first embodiment, water is finally supplied to the catalyst layer on the surface side of the solid electrolyte, whereas in the second embodiment, water is supplied to the side surface side of the solid electrolyte as can be seen from FIG. 10.

Figure 11:
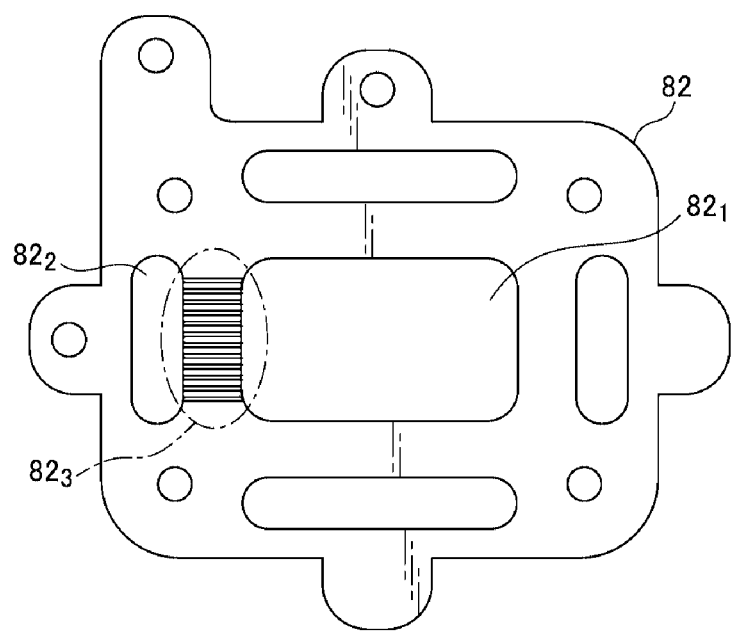
FIG. 11 is a plan view of a gas diffuser/separator on the oxygen side.

FIG. 11 is a plan view of the gas diffuser/separator 82 on the oxygen side. The gas diffuser/separator 90 on the hydrogen side also has the same structure. A recess $82_1$ is formed in the central portion of the gas diffuser/separator 82. The recess $82_1$ is in conformity with the shape of the gas diffusion electrode layer. As the material of the gas diffusion electrode layer, Teflon (registered trademark) modified porous carbon disclosed in Patent Literature 2 can be suitably used as in the first embodiment. By using this material, it is also possible to allow oxygen gas and hydrogen gas to pass through the inside of the gas diffusion electrode layer, and by being subjected to a water repellent treatment as a whole, the gas diffusion electrode layer has strong water repellency and water cannot penetrate into the gas diffusion electrode layer, as in the case of the first embodiment.

As illustrated in FIG. 11, an opening portion $82_2$ is provided on the left side of the recess $82_1$. A plurality of channels $82_3$ are formed between the recess $82_1$ and the opening portion $82_2$ to connect the recess $82_1$ and the opening portion $82_2$. Further, the channels which connect the recess and the opening portion may be one channel as long as it allows the gas to flow. When the cell stack 70 is assembled, the gas diffuser/separator 82 on the oxygen side and the gas diffuser/separator 90 on the hydrogen side illustrated in FIG. 11 are disposed to face each other via a solid electrolyte interposed therebetween. Thus, in the gas diffuser/separator 82 on the oxygen side illustrated in FIG. 9, the channel $82_3$ is provided on the right side of FIG. 9, and in the gas diffuser/separator 90 on the hydrogen side, a channel $90_3$ (not illustrated) is formed on the left side of FIG. 9. Therefore, when the cell stack 70 is assembled, the channel $82_3$ illustrated in FIG. 11 communicates with the gas flow path 77, and the channel $90_3$ communicates with the gas flow path 76. In the water electrolysis mode, the oxygen gas generated on the oxygen side passes through the channel $82_3$ and reaches the opening portion $82_2$, and is guided to the gas flow path 77 from there. On the other hand, the hydrogen gas generated on the hydrogen side passes through the channel $90_3$ and reaches the opening portion $90_3$, and is guided to the gas flow path 76 from there.

Figure 12:
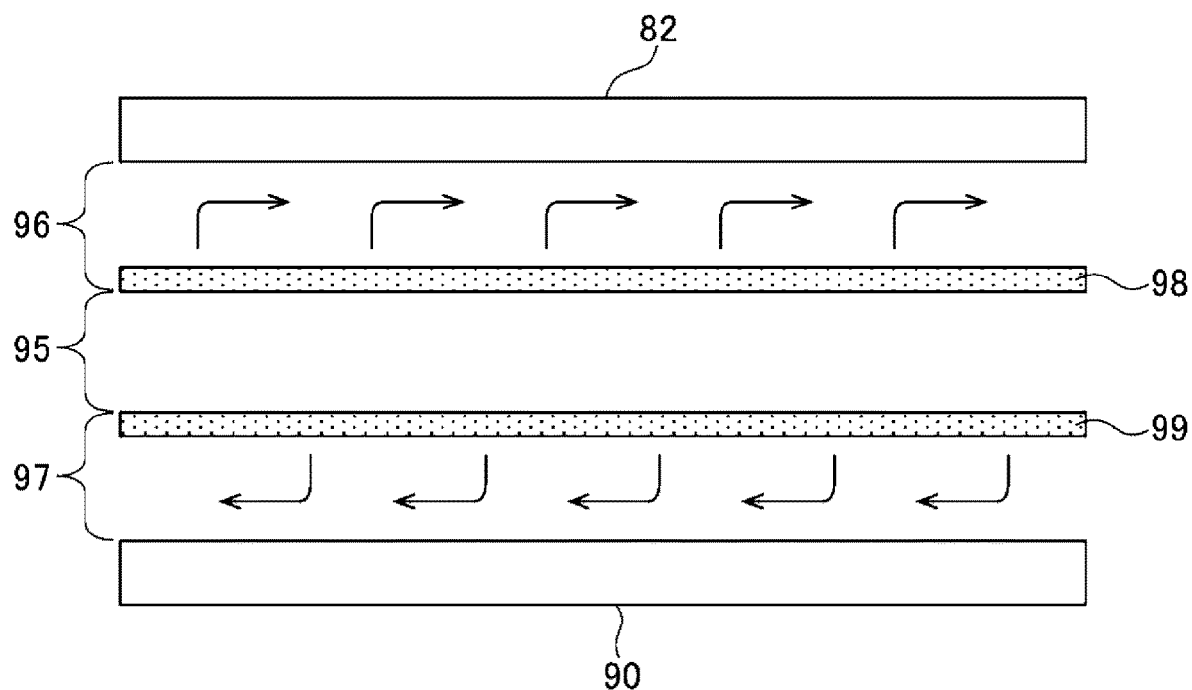
FIG. 12 is an enlarged view schematically illustrating a cross section taken along line B-B of FIG. 10, in one cell of a cell stack in a state in which each part illustrated in FIG. 9 is combined and completed.

FIG. 12 is an enlarged view schematically illustrating a cross section of the central region of one cell of the cell stack 70 completed by combining the respectively parts illustrated in FIG. 9, taken along B-B of FIG. 10. As illustrated in FIG. 12, a solid electrolyte 95 is located in the center portion, a gas diffusion electrode layer 96 on the oxygen side is located on the upper side of solid electrolyte 95, and a gas diffusion electrode layer 97 on the hydrogen side is located on the lower side thereof. In addition, since the solid electrolyte 95 is fitted into the central opening $86_1$ of the solid electrolyte holding portion 86 as described above, the periphery of the solid electrolyte 95, particularly, both left and right side surfaces of FIG. 12 are blocked so that water does not enter and exit. Catalyst layers 98 and 99 are formed on the surfaces on the side of the gas diffusion electrode layer 96 and the gas diffusion electrode layer 97 which are in contact with the solid electrolyte 95. The material of the catalyst layer and the forming method thereof are the same as in the case of the first embodiment. Although the catalyst layer is formed on the gas diffusion electrode layer 96 and the hydrogen diffusion electrode layer 97 on the hydrogen side, a catalyst layer may be formed on the surface of the solid electrolyte 95.

In the water electrolysis mode, voltage is applied to the gas diffusion electrode layers 96 and 97. Further, water is supplied to the solid electrolyte 95 fitted in the central opening 86 via the water flow paths $75_1$ and $75_2$, the opening portions $86_2$ and $86_3$, and the water flow paths $86_4$ and $86_5$ as described above. Accordingly, in FIG. 12, water is supplied to the solid electrolyte 95 in a direction perpendicular to the paper surface. As a result, the oxygen gas generated at the joining interface between the gas diffusion electrode layer 96 and the solid electrolyte 95 is guided to the right in the gas diffusion electrode layer 96 as indicated by an arrow in FIG. 12, reaches the opening portion $82_2$ through the channel $82_3$ illustrated in FIG. 11, and is discharged to the outside from there via the gas flow path 77. On the other hand, the hydrogen gas generated at the joining interface between the gas diffusion electrode layer 97 and the solid electrolyte 95 is guided to the left side in the gas diffusion electrode layer 97 as indicated by the arrow in FIG. 12, reaches the opening portion $90_2$ through the channel $90_3$, and is discharged to the outside from here via the gas flow path 76.

In the fuel cell power generation mode, the flow until the oxygen gas and hydrogen gas supplied from the outside reaches the solid electrolyte 95, and the flow of water generated by the solid electrolyte 95 are opposite to the water electrolysis mode. In the second embodiment, since the gas diffusion electrode layers 96 and 97 have strong water repellency, it is also possible to pressurize the oxygen gas and hydrogen gas to be supplied. By pressurizing the oxygen gas and the hydrogen gas, the water generated in the solid electrolyte 95 is urged to go to the water flow paths $86_4$ and $86_5$ and is smoothly discharged.

As described above, the gas diffusion electrode layers 96 and 97 are subjected to a water repellent treatment and have strong water repellency. As a result, water supplied from the outside to the solid electrolyte 95 via the water flow paths $86_4$ and $86_5$ does not enter the gas diffusion electrode layers 96 and 97. Therefore, the paths of the oxygen gas and the hydrogen gas are completely separated from the water path, and they do not mix. For this reason, even when switching from the water electrolysis mode to the fuel cell power generation mode, water clogging does not occur, and the operation in the fuel cell power generation mode can be stably performed immediately after switching, as in the first embodiment.

Further, as described above, the supply and discharge of water are performed in the first direction substantially perpendicular to the stacking direction, and the supply and discharge of the oxygen gas and the hydrogen gas are performed in the second and third directions substantially perpendicular to the stacking direction, respectively. Thus, a plurality of cells can be stacked, compact dimensions in the stacking direction can be realized, and the capability of the water electrolysis cell and the fuel cell power generation cell can be improved, as in the first embodiment.

Third Embodiment

Next, the water repellent treatment of the gas diffusion electrode layer will be described as a third embodiment. The gas diffusion electrode layer referred to in the present embodiment is a layer in which a material having a property of permeating hydrogen and oxygen generated during electrolysis is used as an anode electrode or a cathode electrode, and it is generally referred to as a gas diffusion layer (GDL). As a base material of the gas diffusion electrode layer, for example, carbon paper with MPL (microporous layer) can be used. A thickness of the carbon paper used is about 0.16 mm. However, MPL is not necessarily required. Such a carbon paper has a certain mechanical strength, electrical conductivity, and has characteristics (good gas permeability) of allowing gas to pass well. However, since this material does not have sufficient water repellency as it is, it is necessary to perform a treatment (water repellent treatment) for imparting sufficient water repellency to the gas diffusion electrode layer.

The method of water repellent treatment of carbon paper in this embodiment is performed in the following procedure. First, a water repellent agent is prepared. As the water repellent agent, it is possible to use an agent prepared by dissolving acetylene black (AB) and polytetrafluoroethylene (PTFE) in a solvent at a predetermined ratio to form fluid. The liquid repellent agent of the fluid is applied on each of the two aluminum foils serving as transfer base materials to have an area sufficient to cover all the carbon paper to be used, and dried as necessary.

Next, carbon paper is sandwiched from both sides in a sandwich shape and brought into close contact with two aluminum foils so that the surface coated with the water repellent agent is in contact with the surface of the carbon paper. This is mounted on a hot press machine and heated under pressure at a temperature of, for example, 360° C. exceeding the melting point (327° C.) of PTFE for several minutes. By doing this, the water repellent agent is reverse transferred from the two aluminum foils to the carbon vapor. Further, after cooling it, the aluminum foil is removed. As a method of removing the aluminum foil, it may be directly and mechanically peeled off, but it is preferable to chemically remove the aluminum foil on the surface by soaking it in an acidic solution (for example, NaCl solution). Therefore, the entire carbon paper is in a state of being uniformly covered with the water repellent agent.

FIG. 13(a) is a cross-sectional view illustrating the state of the end portion of the carbon paper 100 after covering the carbon paper 100 with the water repellent agent 102 by the above-described method. In FIG. 13(a), the side surface of the carbon paper 100 is completely in contact with the water repellent agent. This is thought to be because the water repellent agent which becomes a fluid wraps around to the side surface of each ladder-shaped branch by being heated and pressurized with the hot press machine. However, it is enough to hermetically seal the carbon paper with the water repellent agent, and as illustrated in FIG. 13(b), there may be some clearance between the side surface of the carbon paper and the water repellent agent 102. Further, in a case in which it is enough to coat only one side surface of the carbon paper 100 with the water repellent agent, by applying the water repellent agent only to one aluminum foil as illustrated in FIG. 13(c), it is also possible to reverse-transfer and cover the water repellent agent 102 only to one side of the carbon paper 100. Further, in FIGS. 13(a) to 13(c), the thicknesses of the carbon paper 100 and the coated water repellent agent 102 are exaggeratedly illustrated as compared to an actual one. By coating the water repellent agent 102 on the carbon paper 100 by the method of reverse-transferring the water repellent agent as described above, it is possible to impart a predetermined water repellency to the carbon paper, while maintaining the electric conductivity of the carbon paper.

FIG. 14 is a cross-sectional view illustrating a state in which a carbon paper 100 having the same shape as the ladder-shaped gas diffusion electrode layer 35 illustrated in FIG. 6 is set as a GDL, and the water repellent agent 102 is coated by the aforementioned method. However, in FIG. 14, the thicknesses of the carbon paper 100 and the coated water repellent agent 102 are exaggeratedly illustrated as compared to an actual one. As illustrated in FIG. 14, a water repellent agent 102 is coated to wrap around the carbon paper 100 not only on the upper and lower surfaces but also on the side surfaces of each of the ladder-shaped branches. Thereafter, a catalyst layer is formed on the surface on the side being in contact with the electrolyte to form the gas diffusion electrode layer 35. However, it is also possible to form the catalyst layer on the carbon paper 100 before forming the water repellent layer 102.

According to the water-repellent gas diffusion electrode layer of the present embodiment, it is possible to apply pressure more than before to water to be supplied during electrolysis, and it is possible to improve the performance as a water electrolysis cell. It is thought that this is because, as illustrated in FIG. 7, water repellency is improved by covering even the side surface of each ladder-shaped branch of the gas diffusion electrode layer 35 with the water repellent agent 102, and the entry of water from the side surfaces of each branch can be completely blocked.

The features of the aforementioned third embodiment are summarized as follows:

(1) A method of water repellent treatment of a gas diffusion layer, the method including:

a step of applying a fluid repellent agent to a transfer base material, a step of covering one surface or both surfaces of a planar gas diffusion layer in a portion to which the water repellent agent of the transfer base material is applied, a step of heating the gas diffusion layer covered with the transfer base material while applying pressure to transfer the water repellent agent to the gas diffusion layer, and a step of removing the transfer base material after transfer.

(2) As the water repellent agent for the fluid, it is possible to use an agent obtained by dissolving acetylene black and polytetrafluoroethylene in a solvent at a predetermined ratio.

(3) The temperature when heating in the transferring step can be higher than the melting point of polytetrafluoroethylene.

(4) As the gas diffusion layer, carbon paper can be used.

(5) In the transferring step, a hot press machine can be used.

EXAMPLES

Examples of the aforementioned third embodiment will be described below. It should be noted that the present invention is not limited to the following examples.

Water repellent treatment of the gas diffusion electrode layer was performed as follows.

[1] Preparation of a Spray Coating Solution as a Water Repellent Agent (1) Triton-X 1.0 g, distilled water, 95 mL and ethanol 5 mL were added to a 300 mL beaker and stirred.

(2) Acetylene Black (AB) of 2.0 g was added and stirring was performed for 5 minutes.

(3) Ultrasonic dispersion was performed for 15 minutes.

(4) Ball mill (YTZ ball φ 2.0 mms) was performed for 1 day.

(5) PTFE dispersion (60 wt %) of 20 g was added.

(6) Ball mill (YTZ ball φ 2.0 mm) was performed for 1 hour.

(7) Filtration was performed with a membrane filter (pore size 5.0 μm).

A spray coating liquid having an AB/PTFE weight ratio (PTFE volume ratio) of ⅙ (84%)) was obtained.

[2] Film Formation Using Reverse Transfer (1) Coating was performed on an aluminum foil at a hotplate temperature of 200° C., using a spray coater.

(2) Vacuum drying (temperature 200° C.) was performed for 15 minutes.

(3) MPL carbon paper (GDL29BC) cut to φ22 mm was prepared, and both sides were sandwiched by the coated aluminum foil.

(4) Hot-pressing (260 kg/cm$^2$, for 3 minutes) was performed at a predetermined temperature (280° C., 320° C., and 360° C.).

(5) After hot-pressing, it was immersed in a 5 M NaCl aqueous solution to dissolve the aluminum foil.

(6) Washed with distilled water.

(7) Edges were cut with a cutter.

[3] Observation Result Using SEM

FIG. 15 illustrates an SEM image of the sample after the reverse transfer. FIG. 15(a) is an SEM image when the reverse transfer is not performed, FIG. 15(b) is an SEM image when hot pressed at 280° C., FIG. 15(c) is SEM image when hot pressed at 320° C., and FIG. 15(d) is SEM image when hot pressed at 360° C. Cracks were observed in samples at hot press temperatures of 280° C. and 320° C. Even when the water pressure resistance test was actually performed, water leakage occurred at 0.01 MPa. On the other hand, no crack was observed when the hot press temperature was 360° C. (FIG. 15(d)). The water pressure resistance test was completed to 0.3 MPa. It was thought that this was because PTFE particles were transferred in a dissolved state by performing hot pressing at a temperature equal to or higher than the melting point (327° C.) of PTFE. Further, the gas permeability was 4 mL/atm cm$^2$ mm, and gas permeability was confirmed.

REFERENCE SIGNS LIST

5 Cell stack (cell stack body)
21, 23, 25, 27 Gasket
22, 26 Gas separator
24 Electrolyte layer
31, 33 End plate
32 Intermediate plate
35, 36 Gas diffusion electrode layer
45 Slit 51, 52 Water flow path
54 Hydrogen gas flow path
60 Channel
62 Vent hole
63 Water flow path
65, 67 Gas flow path
66, 68 Flow path
70 Cell stack
76, 77 Gas flow path
80, 92 End plate
82, 90 Gas diffuser/separator
86 Solid electrolyte holding portion
$86_4$, $86_5$ Water flow path
95 Solid electrolyte
96, 97 Gas diffusion electrode layer
100 Carbon paper
102 Water repellent agent

The invention claimed is:

1. A water electrolysis cell and/or a fuel power cell and/or a reversible cell, comprising:
a cell stack part in which an oxygen-side electrode layer, an electrolyte layer, a hydrogen-side electrode layer, a first gas separator configured for an oxygen-containing gas separated from a liquid water to pass through therein between the oxygen-side electrode layer and the electrolyte layer, and a second gas separator configured for a hydrogen-containing gas separated from the liquid water to pass through therein between the electrolyte layer and the hydrogen-side electrode layer are stacked, and a catalyst layer is provided between the oxygen-side electrode layer and the electrolyte layer and/or between the electrolyte layer and the hydrogen-side electrode layer;
a water flow path configured to supply or discharge water in a first direction substantially perpendicular to a stacking direction of the cell;
an oxygen-containing gas flow path configured to discharge the oxygen-containing gas separated from a liquid water or supply oxygen gas in a second direction substantially perpendicular to the stacking direction of the cell; and
a hydrogen-containing gas flow path configured to discharge or supply the hydrogen-containing gas in a third direction substantially perpendicular to the stacking direction of the cell,
wherein each of the oxygen-side electrode layer and the hydrogen-side electrode layer is an electrode layer having water repellency, and
the water flow path, the oxygen-containing gas flow path, and the hydrogen-containing gas flow path are completely independent and separated from each other.

2. The water electrolysis cell and/or a fuel power cell and/or a reversible cell according to claim 1, wherein a plurality of slits are formed in the oxygen-side electrode layer,
a plurality of channels communicating with the water flow path are formed on one surface of the first gas separator, and
the first gas separator and the oxygen-side electrode are stacked, and the plurality of channels are aligned with the plurality of slits of the oxygen-side electrode to supply water from the water flow path to the surface of the electrolyte layer during electrolysis of water.

3. The water electrolysis cell and/or a fuel power cell and/or a reversible cell according to claim 2, wherein a ladder-shaped member is formed between the plurality of slits of the oxygen-side electrode layer,
at least one oxygen-side vent hole penetrating to the other surface and communicating with the oxygen-containing gas flow path is formed in a partially ladder-shaped portion of the first gas separator other than the plurality of channels, and
the oxygen-side vent hole is aligned with the ladder-shaped member of the oxygen-side electrode layer for the oxygen-containing gas having passed through the oxygen-side electrode layer during electrolysis to flow through the oxygen-containing gas flow path.

4. The water electrolysis cell and/or a fuel power cell and/or a reversible cell according to claim 1, wherein
at least one hydrogen-side vent hole penetrating and communicating with the hydrogen-containing gas flow path is formed in the second gas separator, and
the hydrogen-containing gas having passed through the hydrogen-side electrode layer during electrolysis of water flows through the hydrogen-containing gas flow path.

5. A water electrolysis cell and/or a fuel power cell and/or a reversible cell, comprising:
a cell stack part in which a first gas diffuser, an oxygen-side electrode layer held on the first gas diffuser, an electrolyte layer, an electrolyte holding portion which holds the electrolyte layer, a hydrogen-side electrode layer, and a second gas diffuser which holds the hydrogen-side electrode layer are stacked, and a catalyst layer is provided between the oxygen-side electrode layer and the electrolyte layer and/or between the electrolyte layer and the hydrogen-side electrode layer;
an oxygen-containing gas flow path provided in the first gas diffuser in a second direction substantially perpendicular to the stacking direction;
a hydrogen-containing gas flow path provided in the second gas diffuser in a third direction substantially perpendicular to the stacking direction and the second direction; and
a water flow path provided in the electrolyte holding portion in a first direction substantially perpendicular to the stacking direction and configured to supply or discharge water from a side surface of a layer including the electrolyte,
wherein each of the oxygen-side electrode layer and the hydrogen-side electrode layer is an electrode layer having water repellency,
the water flow path, the oxygen-containing gas flow path, and the hydrogen-containing gas flow path are completely independent and separated from each other,
the first gas diffuser is configured to diffuse oxygen gas passing therethrough and to separate oxygen gas from water, and
the second gas diffuser is configured to diffuse hydrogen gas passing therethrough and to separate hydrogen gas from water.

6. The water electrolysis cell and/or a fuel power cell and/or a reversible cell according to claim 1, wherein the electrolyte is a proton ($H^+$) conductive porous electrolyte and/or a dense electrolyte.

7. The water electrolysis cell and/or a fuel power cell and/or a reversible cell according to claim 1, wherein one or both of the oxygen-side electrode layer and the hydrogen-side electrode layer comprises Teflon (registered trademark) modified porous carbon.

8. A cell stack body formed by stacking two or more of the water electrolysis cell and/or a fuel power cell and/or a reversible cell according to claim 1 in the stacking direction, wherein at least a part of water flow paths in each cell are connected to each other, at least a part of oxygen flow paths in each cell are connected to each other, at least a part of hydrogen flow paths in each cell are connected to each other, at least a part of the oxygen-side electrode layers in each cell are electrically connected to each other, and at least a part of the hydrogen-side electrode layers in each cell are electrically connected to each other.

9. The water electrolysis cell and/or a fuel power cell and/or a reversible cell according to claim 5, wherein the electrolyte is a proton ($H^+$) conductive porous electrolyte and/or a dense electrolyte.

10. The water electrolysis cell and/or a fuel power cell and/or a reversible cell water electrolysis/fuel cell power generation according to claim 5, wherein one or both of the oxygen-side electrode layer and the hydrogen-side electrode layer comprises Teflon (registered trademark) modified porous carbon.

11. A cell stack body formed by stacking two or more of the water electrolysis cell and/or a fuel power cell and/or a reversible cell according to claim 5 in the stacking direction, wherein at least a part of water flow paths in each cell are connected to each other, at least a part of oxygen flow paths in each cell are connected to each other, at least a part of hydrogen flow paths in each cell are connected to each other, at least a part of the oxygen-side electrode layers in each cell are electrically connected to each other, and at least a part of the hydrogen-side electrode layers in each cell are electrically connected to each other.

12. The water electrolysis cell and/or a fuel power cell and/or a reversible cell according to claim 1, wherein the second direction and the third direction are substantially perpendicular to the first direction as viewed in the stacking direction.

13. The water electrolysis cell and/or a fuel power cell and/or a reversible cell according to claim 5, wherein the second direction and the third direction are substantially perpendicular to the first direction as viewed in the stacking direction.

* * * * *